(12) United States Patent
Chekhet et al.

(10) Patent No.: US 6,826,065 B2
(45) Date of Patent: Nov. 30, 2004

(54) METHOD OF COMMUTATION OF CURRENT BY BI-DIRECTIONAL SWITCHES OF MATRIX CONVERTERS

(76) Inventors: Eduard Mikhaylovich Chekhet, 39, Moskovskaya str., app. 33, Kiev, 01015 (UA); Vladimir Nikolaevich Sobolev, 20 Davydova str., app. 47, Kiev, 02147 (UA); Valeriy Michaylovich Mikhalsky, 6-bl, Mate Zalki str., app. 130, Kiev, 04211 (UA)

( * ) Notice: Subject to any disclaimer, the term of this patent is extended or adjusted under 35 U.S.C. 154(b) by 441 days.

(21) Appl. No.: 10/101,133

(22) Filed: Mar. 19, 2002

(65) Prior Publication Data

US 2002/0135234 A1 Sep. 26, 2002

(30) Foreign Application Priority Data

Mar. 22, 2001 (UA) .................................... 2001031933

(51) Int. Cl.[7] .............................................. H02M 5/27
(52) U.S. Cl. ....................................... 363/159; 363/163
(58) Field of Search ................................ 363/157, 159, 363/163, 164, 165

(56) References Cited

U.S. PATENT DOCUMENTS

| | | | | |
|---|---|---|---|---|
| 5,594,636 A | * | 1/1997 | Schauder | 363/160 |
| 5,892,677 A | * | 4/1999 | Chang | 363/152 |
| 5,909,367 A | * | 6/1999 | Change | 363/163 |
| 5,949,672 A | * | 9/1999 | Bernet | 363/159 |
| 6,519,170 B2 | * | 2/2003 | Lacaze et al. | 363/152 |
| 6,711,038 B2 | * | 3/2004 | Ziegler et al. | 363/123 |

FOREIGN PATENT DOCUMENTS

EP          0311057 A1  *  5/2003  ............ H02M/5/27

* cited by examiner

Primary Examiner—Adolf Berhane
(74) Attorney, Agent, or Firm—I. Zborovsky

(57) ABSTRACT

A method of commutation of current by separately controlled in each direction bi-directional switches of a matrix converter (MC) with at least three input phases, which allows to provide a safe step-by-step commutation of the current by MC switches without using information of the load current polarity and of the exact relation of mains voltages at the moment of step-by-step commutations beginning.

It is suggested variants of implementing the proposed invention in the three phase-to-three phase MC with a space vector modulation (SVM) which provides the synthesis of space vectors of the output voltage and input current of zero and non-zero stationary vectors during each SVM cycle, with dividing the mains voltage period into six intervals with boundaries being determined by moments of input phase voltage polarity changing. Due to special method of zero vector forming and its alternating with non-zero vectors it is possible to provide a safe commutation of current even under very significant distortions of the mains voltage waveform. All the commutations of the MC switches are expedient and do not create the additional dynamical losses.

4 Claims, 4 Drawing Sheets

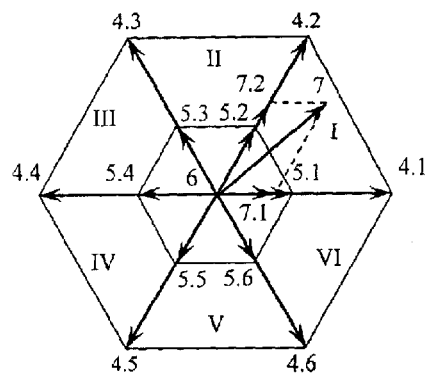
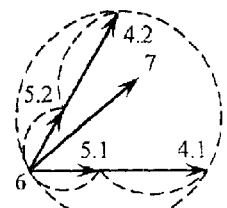
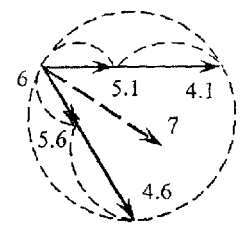
Fig. 5   Fig. 6   Fig. 7
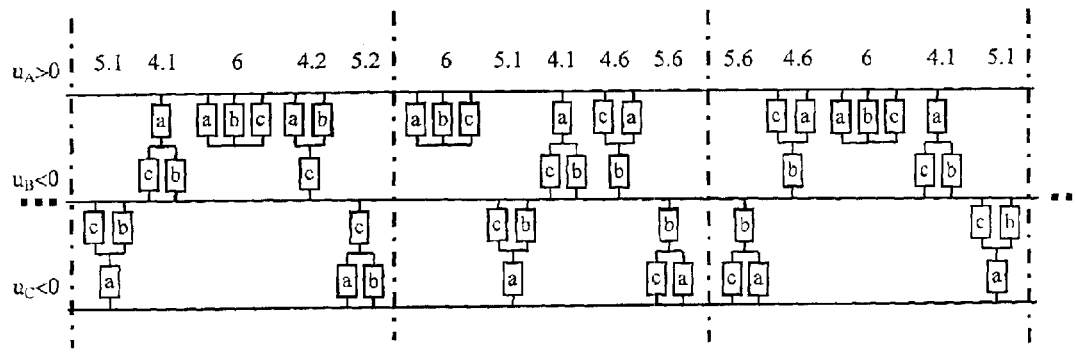
Fig. 8
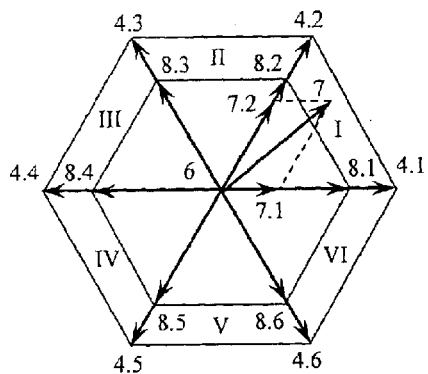
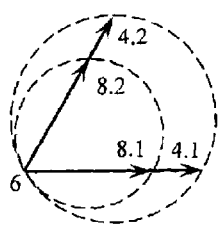
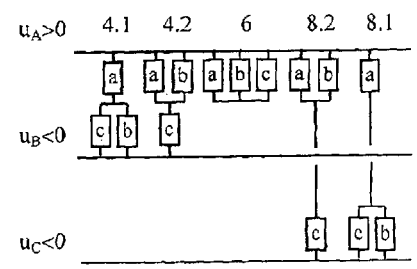
Fig. 9   Fig. 10   Fig. 11

METHOD OF COMMUTATION OF CURRENT BY BI-DIRECTIONAL SWITCHES OF MATRIX CONVERTERS

FIELD OF THE INVENTION

The present invention relates to the field of electrical engineering in general and more particularly to conversion technique and to methods of current commutation by bi-directional switches of matrix converters, for instance to three phase-to three phase matrix converters with a space vector modulation.

The invention can be used in induction motor drives, special power supplies, etc. More particularly this invention can be used in power supplies on a base of AC-AC converters with control and stabilization of output frequency.

BACKGROUND OF THE INVENTION

There are well-known methods of current commutation by bi-directional switches which consist of two separately controlled halves having the opposite direction conductivity, that are based on information about polarity of load current ($I_L$) of matrix converters (MC) [P. Wheeler, D. Grant, "Optimized input filter design and low-loss switching techniques for a practical matrix converter", in *IEE Proc.-Electr. Power Applicat.*, vol.144, no.1, pp.53–60, January 1997; L. Empringham., P. W. Wheeler, J. C. Clare, "Matrix converter bi-directional switch commutation using intelligent gate drives", IEE Power Electronics and Variable Speed Drives Conference, No.456, London, September, 1998], or on information about relation of mains voltages [M. Ziegler, W. Hofmann, "Semi natural two steps commutation strategy for matrix converter", in *Rec. 29th Annual IEEE meeting, PESC'98*, 1998, vol.1, pp. 727–731; H. Youw, B. H. Kwon, "Switching technique for current controlled AC-to-AC converters", *IEEE Trans. Ind. Electron.*, vol. 46, no. 2, pp. 309–318, April 1999].

In case of tracking the $I_L$ polarity, halves of switches are being controlled separately for every current polarity. It allows to provide a correct commutation (without short circuit currents and overvoltages under breaking current in the load inductance), if the polarity of $I_L$ is single-valued. If current $I_L \approx 0$ or changes its polarity repeatedly during the period of the output voltage, a method proposed in [P. W. Wheeler, D. Grant, "Optimized input filter design and low-loss switching techniques for a practical matrix converter", in *IEE Proc.-Electr. Power Applicat.*, vol.144, no.1, pp 53-60, January 1997], does not allow to get any exact determination of step-by-step commutations order of switches halves under every changing of current $I_L$ polarity. According to [L. Empringham, P. W. Wheeler, J. C. Clare, "Matrix converter bi-directional switch commutation using intelligent gate drives", IEE Power Electronics and Variable Speed Drives Conference, No.456, London, September, 1998], the polarity of $I_L$ is being defined on the difference of voltage across switches halves at every moment of time. It allows to define enough exactly the moment when current falls to zero. But this method requires a considerable increasing of intellectual potential of power switches drivers and the further complication of logical part of control system due to multiple cross connections between drivers of all the switches of every output MC phase. Besides, after the fixing of zero current it appears an uncertainty in subsequent choice of the necessary order of switching the switches halves, and this also complicates a realization of the commutation method.

Under the real conditions, when the output current curve is a high frequency ripple and crosses zero line repeatedly, a method realization of how to transfer current from one switch to another with using mentioned method will be complicated.

Under using methods being based on information of the relation of mains voltages, the voltages period is being divided into intervals with said relation being constant, and it is turned constantly on those halves of all switches which are connected to a load phase and which do not produce paths for short circuit currents during current interval of the mains voltage [M. Ziegler, W. Hofmann, "Semi natural two steps commutation strategy for matrix converter", in *Rec. 29th Annual IEEE meeting, PESC'98*, 1998, vol.1, pp. 727–731], or halves of only two switches being connected to input phases with maximal and minimal voltages within the interval given [H. Youw, B. H. Kwon, "Switching technique for current controlled AC-to-AC converters", *IEEE Trans. Ind. Electron.*, vol. 46, no. 2, pp. 309–318, April 1999].

Such approach allows to provide for a MC phase constant being of conditional freewheeling diodes on the analogy with voltage source inverters and gives a possibility to make switches commutation with dead time, because there always is a way for current of both polarity. But in the moments of approximate equality of phase voltages, especially if they are distorted (for instance, as a result of flowing the modulated current being supplied from the mains through filter inductance) and repeatedly are being compared under intervals changing, it appears an uncertainty when fixing boundaries of mains voltage intervals.

The uncertainty in the choice of switches halves which are to be constantly turned on during the interval results in short circuit currents through the switches in case of overlap time, or in current breaking under commutations, if the half of the switch which is necessary for current conducting during dead time appears to be turned off. In the case of significant distortions of input voltages methods mentioned above can not be used.

The prior art of the proposed invention is a method of commutation of current by bi-directional switches of matrix converters with at least three input phases, the switches consisting of two separately controlled halves with the opposite directions conductivity, which implies that under transferring current from the switch being turned on in both directions and connected to one input phase to the switch being connected to another input phase, it is being turned on the half of the switch that does not make a way for flowing short circuit current between the first and the second of mentioned phases for current relation of phases voltages on the first stage of commutation, on the second stage it is being turned off the half of the switch that is unidirected with the turned on half of the switch at the first stage of commutation that is being turned off, it is being turned on the second half of the switch that is being turned on at the third stage, and it is being turned off the second half of the switch that is being turned off [L. Mazet, H. Boulant, J-J. Huselstein, C. Glaize, "Switching control in three phase matrix converters by discrimination of command orders", in Proc. PEMC'98, vol 2, Prague, Czech Republic, 1998, pp.2-64–2-67]. During time intervals where it exists the complete certainty of the relation of voltages for those phases with switches being switched the step-by-step algorithm described provides the correct current commutation.

A disadvantage of this and above mentioned methods is lack of conditions for realization of a safe step-by-step algorithm of switches commutation on intervals where it is impossible to define exactly the relation between input phase voltages, especially under distortions of curves of mains phase voltages with connected switches which take part in commutation.

SUMMARY OF THE INVENTION

It is a primary object of the present invention to provide a method of current commutation by bi-directional switches of matrix converters with at least three input phases, which allows to avoid short circuits current through the switches and overvoltages on circuit elements due to eliminating commutations between switches being connected to those mains phases for which it is impossible to determine exactly the voltages relation between them for a given moment of time.

It is another object of the present invention to provide a method of current commutation by bi-directional switches of a three phase—to three phase MC with a space vector modulation (SVM), which provides the withdrawal of commutations between switches being connected to those mains phases, for which it is impossible to determine exactly the relation of voltages between them for a given moment of time, by means of forming a zero vector by a simultaneous turning on of all the switches of MC which are connected to input phase with the extremal module of voltage for a given moment of time.

It is a further object of the present invention to create conditions for using said method of commutation under forming of the output voltage with a deep control of a shift angle between input phase voltage and input current of MC.

And, finally, it is a further object of the present invention to provide a safe current commutation with optimization of switching rate during every SVM cycle under using the most useful mode of control of MC which is of the maximal possible relation between input and output voltages and performs the MC power factor close to 1.

The primary and other objects of the present invention are attained by the method of commutation of current by bi-directional switches of matrix converters with at least three input phases, the switches consisting of two separately controlled halves with the opposite directions conductivity, which implies that under transferring current from the switch being turned on at both directions which connects load to one input phase, into other switch which connects load to another input phase, it is being turned on the half of the switch that does not make a way for short circuit current flowing between said first and second phases for current relation of input phase voltages on the first stage of commutation, on the second stage it is being turned off the half of the switch that is unidirected with the half of the first switch being turned on at the first stage of commutation, it is being turned on the second half of the second switch at the third stage, and it is being turned off the second half of the first switch under the need to turn off the first one and turn on the second of the switches which are connected to mains phases, for which it is impossible to estimate exactly voltage polarity between them for a moment of step-by-step switching beginning, it is being identified the mains phase with the extremal module of voltage at given moment of time and it is being done an intermediate current commutation from the first switch into the third one which connects load to the said phase with the extremal module of voltage, whereupon current is being transferred into another switch.

In a three phase—to three phase MC with a space vector modulation (SVM) which provides synthesis of space vectors of output voltages (for instance, the phase voltage—$U_{out}$) and input current of zero and non-zero stationary vectors during every SVM cycle with using in turn two line voltages of the mains for non-zero stationary vectors forming and with dividing of a mains voltage period into six intervals with boundaries being determined by moments of input phase voltages polarity changing, under a necessity of transferring of MC load current from the first switch being turned on at both directions which provides connecting load to the first input phase, into the second switch which provides connecting load to the second input phase, according to the order of the switches halves step-by-step switching which is being set by voltages current relation for these input phases, and under impossibility of the exact estimation of the said voltages relation, the object of the invention is attained by forming a zero vector by the simultaneous turning on all the MC switches being connected to the third input phase which is the phase with the extremal module of voltage within a mains current interval, and thus it is being formed an intermediate current commutation from the first switch into the third switch which provides the connection of load to the said phase with the extremal module of voltage, whereupon current is being transferred into the second switch.

If it is being in turn used two input line voltages for non-zero stationary vectors forming, one of them is shifted by 60 electrical degrees relative to the other and is of minimal module within a current interval of the mains voltage, then the object of the invention is attained by grouping the non-zero vectors according to the sign of alternating of unidirected vectors or of forming of the extremal module input line voltage vectors, and if the last vector of the previous group and the first vector of the next group are non-unidirected and at least one of them is formed of the minimal module input line voltage within the interval of mains voltage period, then a zero vector is being placed between these groups in accordance with time of forming.

In the case of non-zero vectors forming by in turn using two input line voltages which are the extremal module ones within a current interval of mains period, the object of the invention is attained by grouping the non-zero vectors according to the sign of forming of the same input line voltage and a zero vector is being placed between these groups in accordance with time of forming, and under conjugating of SVM cycles the last vector of the previous period and the first vector of the next period is being formed of the same input line voltage.

A comparative analysis with other technical decisions shows that the proposed method differs from the known methods by the fact, that the proposed method allows to exclude current commutation between MC switches being connected to those mains phases for which it is impossible to determine exactly the voltages polarity between them for a given moment of time, and due to that fact the commutations are being done correctly, without short circuit current through the switches and overvoltages on circuits elements, under using the proposed method for the MC with SVM containing a zero component within every cycle, all the switchings of switches being correct and functionally expedient.

BRIEF DESCRIPTION OF DRAWINGS

More detailed explanation of the proposed invention is given below with referring to drawings, where

FIG. 5 is a diagram of the space vector $U_{out}$ and stationary vectors under using two input line voltages for non-zero vectors forming, one of which is shifted by 60 electrical degrees relative to another voltage and is of the minimal module within a current interval of the mains voltage;

FIG. 6 and FIG. 7 are vector diagrams with possible variants of the order of alternating of stationary vectors during synthesis of space vector $U_{out}$ under its different placements;

FIG. 8 shows schemes of connecting output phases of the MC to mains phases for every of the stationary vectors in FIGS. 6 and 7;

FIG. 9 is a diagram of the space vector $U_{out}$ and stationary vectors under using two line voltages of the mains having the maximal module within a current interval of the mains voltage period, for non-zero vectors forming;

FIG. 10 is a vector diagram with possible variants of the order of alternating of stationary vectors during synthesis of $U_{out}$ (FIG. 9);

FIG. 11 shows schemes of connecting input phases of the MC to mains phases for every of the stationary vectors pictured in FIG. 10;

DESCRIPTION OF PREFERRED EMBODIMENTS

Figure 1:
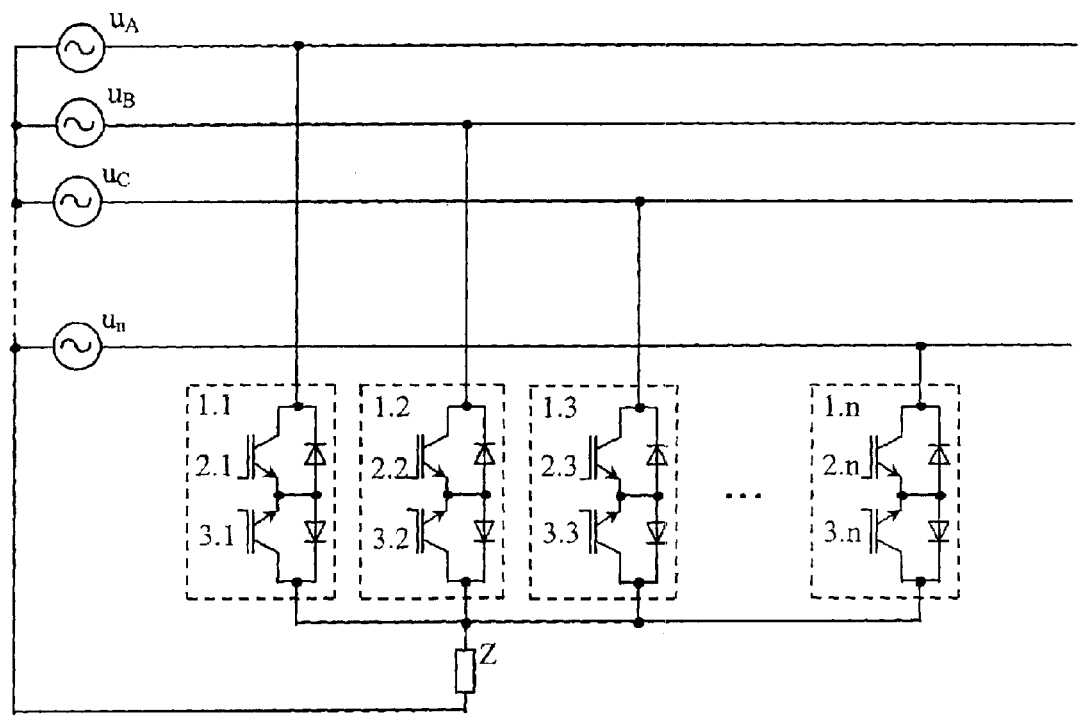
FIG. 1 is the scheme of the power part of n phase—single phase MC.
Figure 3:
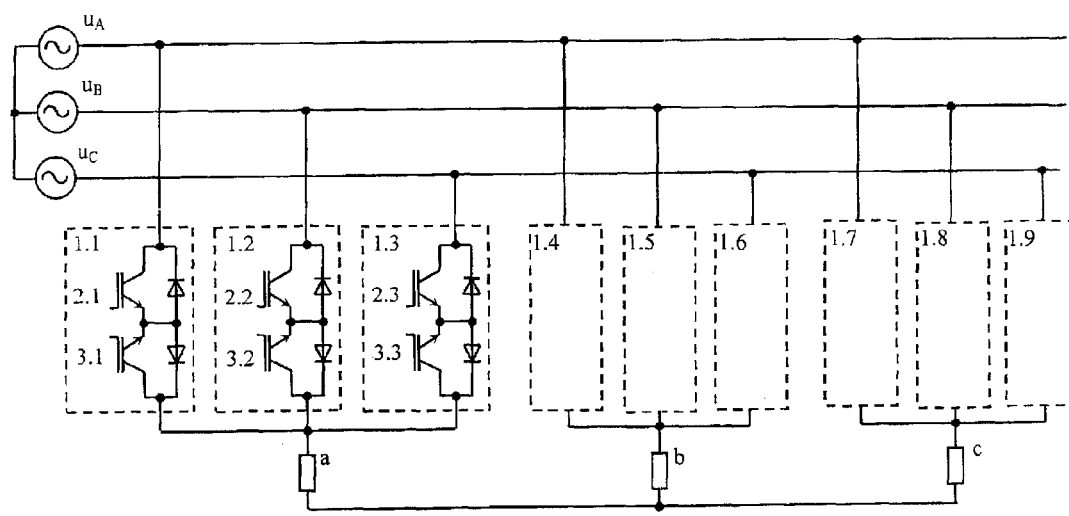
FIG. 3 is the scheme of the power part of the three phase—three phase MC.
Figure 12:
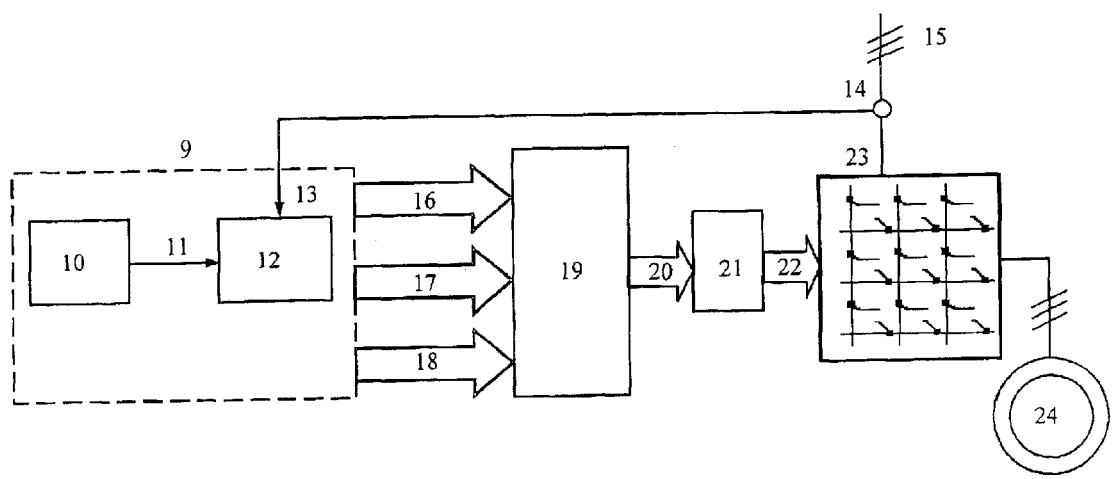
FIG. 12 is an example of the functional scheme of the device for realization of the proposed method according to item 2.

Let us analyze the proposed method of current commutation by an example of the n-phase-single phase MC scheme (FIG. 1) and the three phase—three phase MC with SVM (FIG. 3 and FIG. 12).

MC (FIG. 1) contains n bi-directional switches 1 (1.1–1.n) which consist of separately controlled halves 2 (2.1–2.n) conducting current from input phases A, B, C, ... n to load Z, and separately controlled halves 3 (3.1–3.n) conducting current in the opposite direction. Switch configuration of two IGBTs being connected by emitters with parallel switched freewheeling diodes is chosen as one of the possible and is not of principal importance for the explanation of the proposed method.

The three phase-three phase MC (FIG. 3) contains nine bi-directional switches 1.1–1.9 comprising of halves 2.1–2.9 and 3.1–3.9 and is done for the explanation of the proposed method of current commutation under using the MC with SVM.

In the time diagram of supply voltages of the three phase—three phase MC (FIG. 4) a voltage period is divided into six intervals with boundaries being determined by moments of input phase voltages polarity changing. The intervals are marked by numerals of the three-digit binary code: 101, 100, 110, 010, 011, 001; every digit means a polarity of the corresponding phase voltage of phases ABC, accordingly to digit position ("1" is the positive polarity, "0" is the negative one). For instance, for the interval 100 $u_A>0$, $u_B<0$, $u_C<0$.

The diagram in FIG. 5 shows stationary vectors which may be used for the synthesis of $U_{out}$ of the MC for the moment $t_n$ (FIG. 4) under non-zero vectors forming of two line voltages (for instance, $u_{AB}$ and $u_{CB}$), one of the voltages ($u_{CB}$) is shifted by 60 electrical degrees relative to another voltage and is of the minimal module within a current interval of the mains voltage which is marked by the code 100 (for forming of non-zero vectors it can be used also the line voltage $u_{AC}$ and the second line voltage $u_{BC}$ which is of the minimal module within the interval 100). Designations 4.1–4.6 correspond to vectors which are being formed of the line voltage $u_{AB}$ and designations 5.1–5.6 correspond to vectors which are being formed of line voltage $u_{CB}$. The designation 6 corresponds to the zero vector. Non-zero stationary vectors create six sectors on the plane; they are designated in the diagram as I-IV. The designation 7 corresponds to the space vector $U_{out}$ of the MC, which is formed in the sector I of the diagram, designations 7.1 and 7.2 correspond to its directional components of stationary vectors (4.1, 5.1 and 4.2, 5.2) which form boundaries of the 60 degrees sector I. The vector diagram in FIG. 6 explains possible variants of the order of alternating of stationary vectors 4.1, 5.1, 4.2, 5.2, 6 during synthesis of the space vector $U_{out}$. The vector diagram in FIG. 7 explains possible variants of the order of alternating of stationary vectors 4.1, 5.1, 4.6, 5.6, 6 for synthesis of the space vector $U_{out}$ in the sector VI (FIG. 5). Schemes of connecting of MC output phases to the mains phases (FIG. 8) correspond to every of stationary vectors 4.1, 5.1, 4.2, 5.2, 4.6, 5.6, 6 on the three adjacent SVM cycles under moving of the space vector $U_{out}$ from sector I to sector VI (FIG. 5-FIG. 7), the first (from the left) cycle being the last in sector I, and two following ones are the first and the second cycles accordingly in sector VI. The diagram in FIG. 9 shows stationary vectors that can be used for synthesis of the matrix converter $U_{out}$ for the moment $t_n$ (FIG. 4) under non-zero vectors forming of two line voltages ($u_{AB}$ and $u_{AC}$) which are of the extremal module with the current interval being marked by the code 100. Designations 4.1–4.6 correspond to vectors being formed of the line voltage $u_{AB}$, and designations 8.1–8.6 correspond to vectors being formed of the line voltage $u_{AC}$. The designation 6 corresponds to the zero vector. Six sectors in the vector diagram are designated by Roman numerals I-VI.

The designation 7 corresponds to the MC space vector $U_{out}$ being formed in the sector I of the diagram, and designations 7.1 and 7.2 correspond to its components being oriented along stationary vectors (4.1, 8.1 and 4.2, 8.2) which form boundaries of the 60 degrees sector I. The vector diagram on FIG. 10 explains possible variants of the order of alternating of stationary vectors 4.1, 4.2, 8.1, 8.2 and 6 during synthesis of space vector $U_{out}$. Schemes of connecting of MC output phases to the mains phases (FIG. 11) correspond to every of stationary vectors 4.1, 4.2, 8.1, 8.2 and 6 in FIG. 10. The functional scheme of the device for realization the proposed method in the MC with SVM (FIG. 12) consists of the controller 9 being made, for instance, on the base of a signal processor. The controller 9 contains a unit 10 of task forming connected to input 11 of the modulator 12 with the second input 13 being connected to the three phase voltage sensor 14 which is connected to input mains 15. Outputs 16–18 of the controller are connected with inputs of the programmed logical matrix 19 with outputs 20 being connected with inputs of the drivers scheme 21. Outputs 22 of the drivers scheme 21 are connected to the power unit 23 of MC with outputs being, in their turn, connected with load 24, for example an asynchronous motor.

Figure 2:
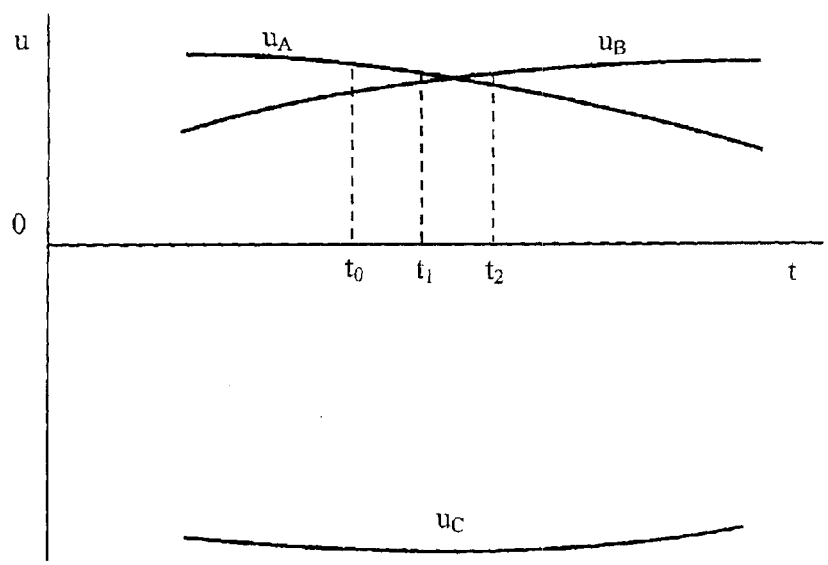
FIG. 2 is a fragment of time diagram of mains voltages under realization of the proposed method according to the item 1 for case when n=3.

For the n phase—single phase MC (FIG. 1) in which according to an arbitrary algorithm it is being turned on a switch in every moment of time, the current commutation in accordance with the proposed method is being made as following. If it is necessary to turn off the switch (1.1) being turned on at both directions and to turn on the other switch (1.2) in the moment $t_o$ (the time diagram of supply voltages in FIG. 2), then the commutation is being done according to the prior art method: turning on 2.2—turning off 2.1—turning on 3.2—turning off 3.1, because there is the certainty of $u_A$ and $u_B$ relation in the moment $t_0$ ($u_A > u_B$) even under a distortion of voltage curve (the diagram in FIG. 2). If it is necessary to do the current commutation which is given above, from the switch (1.1) into the switch (1.2) within the interval $t_1$-$t_2$ (FIG. 2), especially under substantial distortions of curves $u_A$ and $u_B$, that is under lack of the certainty of voltages relation, then the commutation is being done as following: turning on 2.3—turning off 2.1—turning on 3.3—turning off 3.1—turning on 3.2—turning off 3.3—turning on 2.2—turning off 2.3. Such switching is safe regarding short circuit currents through switches and overvoltages across them due to single-valued relations $u_A > u_C$ and $u_B > u_C$.

The additional switching which is given above is universal and usable in all the converters with bi-directional switches, but it requires the increase of commutations rate and, as a consequence, the increase of dynamical losses. At the same time, under using the proposed method of commutation in MCs with SVM it is possible to create the algorithm of forming the space vector of the MC output voltage in such a way that all switching will be functionally expedient.

The essence of the SVM method in MCs (FIGS. 3–11) is in forming reference space vectors of output voltage and input current which are being determined as averaged values within a single cycle of SVM, that is the period of the carrier frequency. As a rule, a reference space vector is being obtained as a result of its synthesis of five stationary vectors—one zero and four non-zero, as shown, for example, in [L. Zhang, C. Watthanasarn, W. Shepherd, "Analysis and implementation of a space vector modulation algorithm for direct ac-ac matrix converter", *EPE Journal*, vol. 6, no. 1, pp. 7–15, May 1996], which in pairs form boundaries of a sector with placing the reference vector inside, for example 7 (FIGS. 5,9). For non-zero vectors forming it is being alternately used two of three line voltages of the mains. Amplitudes of non-zero vectors of the phase output voltage are equal ⅔ of instantaneous values of input line voltages they are formed of. The zero vector is being created under connecting of all the output phases of the MC to a phase of the mains. A duration of non-zero vectors using within a SVM cycle is being defined by the modulation law (as a rule, it is a sinusoidal one) and is being calculated for the given cycle, reasoning from the required value of the space vector $U_{out}$ and current relation of mains voltages. A duration of the zero vectors using supplements the sum of time intervals for non-zero vectors using to the full SVM cycle. Every stationary vector of the MC output voltage corresponds with the stationary vector of input current, and the set of four non-zero and one zero vectors allows to obtain the averaged space current vector which traces out the trajectory being close to circle with mains frequency.

Under forming of stationary vectors of two input line voltages (for example, $u_{AB}$ and $u_{CB}$ on the interval 100, FIG. 4), one of them ($u_{CB}$) being shifted by 60 electrical degrees relative to the other ($u_{AB}$) and having the minimal module within a current interval of the mains voltage period, it is possible to control the angle between space vectors of input current and voltage.

Stationary vectors forming exclusively of two maximal line mains voltages ($u_{AB}$ and $u_{AC}$ within the current interval 100, FIG. 4) allows to hold the angle between space vectors of input current and input phase voltage close to zero under maximal possible input/output voltage ratio of the MC. Such algorithm of SVM can be considered as the most typical for using in three phase—three phase MCs.

Let us consider the synthesis of the vector 7 in the sector I (FIG. 5) for the moment $t_n$ (FIG. 4) with using the zero vector 6 and non-zero vectors 4.1, 5.1 (obtaining the component 7.1), 4.2, 5.2 (obtaining the component 7.2).

The sequence of five vectors forming during a SVM cycle can be arbitrary under obtaining reference space vectors. Such factors as optimization of the rate of commutations, minimal durations of stationary vectors using during a SVM cycle, distortions of input current, and so on can be considered as criterions for choosing of one or other strategy of the sequence. It will be shown below how the proposed method is being used in MCs on the example of SVM mentioned above.

Each of the mentioned stationary vectors is corresponded by the certain state of the MC; the state is being described by a combination of switches being turned on. Thus, in the given moment $t_n$ on the interval 100 (FIG. 4) the combination of switches 1.1, 1.5, 1.8 (FIG. 3) corresponds with the stationary vector 4.1; the combination of switches 1.3, 1.6, 1.8 (FIG. 3)—with the stationary vector 5.2, and so on. Under the transition from one state (vector 4.1) to another one (vector 5.2) in the middle of the interval 100 (FIG. 4), when it is being compared phase voltages of phases B and C, it appears an uncertainty in the sequence of step-by-step current commutation between switches 1.5 and 1.6 (FIG. 3). Besides, under transitions from states mentioned above to the zero vector, when the said vector is being formed by simultaneous turning on of switches being connected to phases B or C, that is switches 1.2, 1.5, 1.8 or 1.3, 1.6, 1.9 (FIG. 3), it also appears the uncertainty for switches pairs 1.2 and 1.3, 1.5 and 1.6, 1.8 and 1.9 (FIG. 3). Correct commutations in the middle of the interval 100 (FIG. 4) are possible only between switches 1.1 (1.4, 1.7) and any other one in every phase of the MC.

In FIG. 6 these stationary vectors are connected with stroke lines for the considered sector I and mains voltage relation, for which the direct sequence is provided by commutation of the switches being connected to input phases with the voltages polarity being exactly defined within a current interval of mains voltage period. In other words, it is allowed mutual transitions between non-zero vectors 4.1–5.1, 4.2–5.2 and 4.1–4.2, and mutual transitions between the zero vector 6 and any of non-zero vectors. As it can be seen in FIG. 6, it is possible to unite non-zero vectors into groups which consist of one or several vectors, for example (the possibility of mutual transitions is marked as ⇆):

a) 5.1 and 5.2⇆4.2⇆4.1
b) 5.2 and 5.1⇆4.1⇆4.2
c) 4.1⇆5.1 and 5.2⇆4.2
d) 5.1⇆4.1⇆4.2⇆5.2.

In the three first cases a), b), c) it is necessary to place the zero vector between groups of non-zero vectors and in the last case d) the placement of the zero vector within a SVM cycle is arbitrary. Under transition from one SVM cycle to another it is possible to alternate vectors in the reverse order.

For example, the algorithm of alternating of five stationary vectors in SVM cycles which follow one another can be built as following:

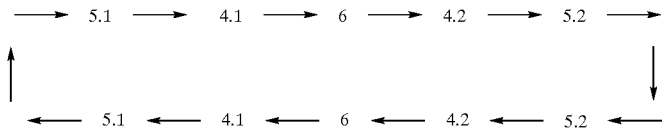

This variant provides a smaller of switches commutations compared with other mentioned variants.

Under transitions of the vector $U_{out}$ from one sector to another one the algorithm mentioned above in variant d) with arbitrary placing of zero vector remains without changing only for a case when $U_{out}$ forming on next cycle is started of using the same stationary vector with which it was finished the previous SVM cycle, for example under the transition from the sector I to the sector VI (FIGS. 5, 6, 7):

... |5.2→4.2→6→4.1→5.1→|5.1→4.1→6→4.6→5.6→|5.6→4.6→6→4.1→5.1→|...

If under this transition the previous SVM cycle is being finished by the non-zero vector 5.2, then the placing of the zero vector within the first cycle after the transition can not be arbitrary, because it must delimit in time those non-zero vectors for which alternation is inadmissible. During next SVM cycles within the sector VI the placement of vectors corresponds with variant d). For the example given above the last SVM cycle in the sector I and the first and the second ones in the sector VI will look like that:

... |5.1→4.1→6→4.2→5.2→|6→5.1→4.1→4.6→5.6→|5.6→4.6→6→4.1→5.1→|...

Schemes of connecting output phases of the MC to mains phases, which correspond to stationary vectors in FIGS. 6, 7 and to states of MC switches for the vectors realization are given in FIG. 8. They show the process of transferring of the vector $U_{out}$ from the sector I into the sector VI and explain differences in placement of the zero vector within the first SVM cycle after changing the sector, and within other cycles. Here the zero vector 6 does the function of delimitation between non-zero vectors 5.2 and 5.1. In the next SVM cycles the zero vector is being placed in the middle of the period with the purpose of decreasing of switches commutations.

Thus, for the realization of the proposed method under forming of non-zero stationary voltage vectors of two line mains voltages (for example, $u_{AB}$ and $u_{CB}$ on the interval 100, FIG. 4), one of them ($u_{CB}$) being shifted by 60 electrical degrees relative to another one ($u_{AB}$) and having the minimal module within this interval, it is necessary:

1) To form zero vectors by simultaneous turning on of all the switches being connected to the mains phase with the maximal module of voltage and which differs by the sign from two other phase voltages for a current interval of the mains voltage period. For the considered interval 100 (FIG. 4) this is the phase A, and the switches being turned on—switches 1.1, 1.4, 1.7 (FIG. 3).
2) To form non-zero vectors according to the sign of alternating only unidirected (4.1 and 5.1, 4.2 and 5.2) or being formed of the maximal module line voltage vectors (4.1 and 4.2) for the interval 100 (FIG. 4) in the sector I (FIGS. 5,6).
3) To place zero vector in accordance with time of forming between those groups in which the last vector of the previous group and the first vector of the next group are non-unidirected and at least one of them is formed of the minimal module line voltage within the interval of mains voltage period. For interval 100 (FIG. 4) in sectors I and VII (FIGS. 5-7) pairs of vectors 4.1 and 5.2, 4.1 and 5.6, 4.2 and 5.1, 4.2 and 5.6, 4.6 and 5.1, 4.6 and 5.2, 5.1 and 5.2, 5.1 and 5.6, 5.2 and 5.6 are those which are sure to be delimited with using of zero vectors.

Figure 4:
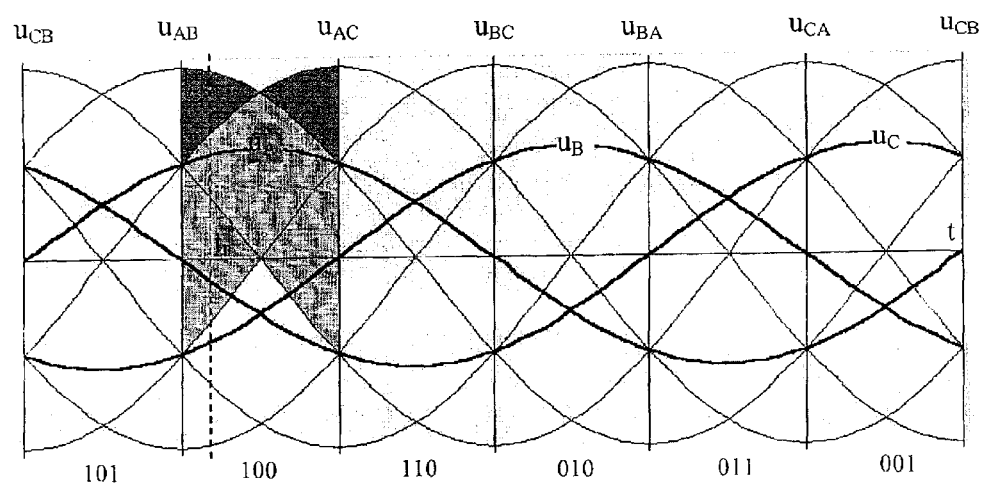
FIG. 4 is a time diagram of supply voltages of the three phase—three phase MC.

For the synthesis of the vector 7 in the sector I (FIG. 9) for the moment $t_n$ (FIG. 4) it is being used the zero vector 6 and non-zero vectors 4.1, 8.1 (for obtaining the component 7.1), 4.2, 8.2 (for obtaining the component 7.2) which are being formed of two line voltages having the maximal module ($u_{AB}$ within the current interval 100, FIG. 4). This kind of forming of two line voltages having the maximal module is the basic method of MC control, because it allows to get the maximal input/output voltages ratio and the angle between space vectors of input current and input voltage, which is close to zero.

Each of stationary vectors mentioned above corresponds to the fixed state of the MC; this state is being described by the combination of the switches being turned on. So, for the moment $t_n$ within interval 100 (FIG. 4), the combination of switches 1.1, 1.5, 1.8 (FIG. 3) corresponds to stationary vector 4.1; the combination of switches 1.1, 1.4, 1.9 (FIG. 3)—to vector 8.2, and so on. Under the transition from one state (vector 4.1) to another one (vector 8.2) in the middle of the interval 100 (FIG. 4), when it is being compared phase voltages of phases B and C, it appears the uncertainty of the sequence performance of step-by-step current commutation between switches 1.8 and 1.9 (FIG. 3). Besides, under transitions from states mentioned above to the zero vector, when the last is being formed by simultaneous turning on switches being connected to phases B or C, that is switches 1.2, 1.5, 1.8 or 1.3, 1.6, 1.9 (FIG. 3), it also appears the uncertainty mentioned above for pairs of switches 1.5 and 1.6, 1.8 and 1.9 (FIG. 3). Correct commutations in the middle of interval 100 (FIG. 4) are possible only between switch 1.1 (1.4, 1.7) and any other switch in each MC phase.

In FIG. 10 for the considered sector I and under the relation of mains voltages in the moment $t_n$ within the current interval 100 (FIG. 4) it is being connected with stroke lines those stationary vectors, for which the direct sequence is provided by commutation of the switches being connected to input phases with the voltages polarity being exactly defined within the current interval of mains voltage period. That is, it is allowed mutual transitions between non-zero vectors 4.1–4.2 and 8-1–8.2, and also between the zero vector and any other one.

After finishing one SVM cycle it is possible to reverse the direction of the round of vectors on the next cycle, that is to alternate them with the reversed order in comparison with the previous cycle.

Possible variants of vectors sequence within the SVM cycle and under the transition from one period to another for placing the vector $U_{out}$ in the sector I (FIGS. 9, 10) look like that:

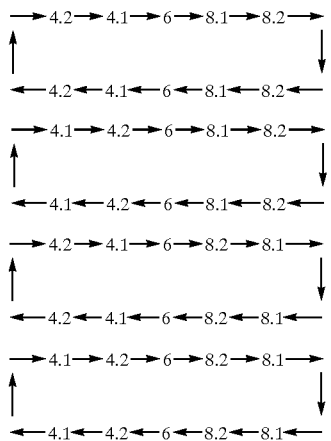

Other permissible variants can be obtained by uniting combinations of four basic ones mentioned above, for example, f) and g):

... 4.1→4.2→6→8.1→8.2→8.1→8.2→6→4.1→ 4.2→4.1→. . .

Schemes of connecting output phases of the MC to mains phases which correspond with stationary vectors in FIG. 9, 10 and with states of MC switches for the vectors realization are represented in FIG. 11. The alternating of stationary vectors within SVM cycles is being done in accordance with the variant h) mentioned above in direct and reverse directions. This variant having the first and the last non-zero vectors with odd numbers (4.1, 4.3, 4.5 and 8.1, 8.3, 8.5 in FIG. 9) within the SVM cycle differs from the others by the less of commutations during the cycle:

... 4.3→4.2→6→8.2→8.3 ... —for the sector II,
... 4.3→4.4→6→8.4→8.3 ... —for the sector III,
... 4.5→4.4→6→8.4→8.5 ... —for the sector IV,
... 4.5→4.6→6→8.6→8.5 ... —for the sector V,
... 4.1→4.6→6→8.6→8.6 ... —for the sector VI.

Under transition of the vector $U_{out}$ from one sector into another, for example, from the sector I into the sector II (FIG. 9) the algorithm of stationary vectors alternating remains the same:

... |4.1→4.2→6→8.2→8.1→|8.3→8.2→6→4.2→ 4.3→|4.3→4.2→6→8.2→8.3→|. . .

For conjugation SVM cycles both inside the sector and under transitions of the vector $U_{out}$ between sectors (FIGS. 9, 10) it is necessary to form non-zero vectors in the end of the previous and at the beginning of the next cycle using the same line voltage.

Thus, for the realization of the proposed method under non-zero stationary vectors forming of two mains line voltages with the maximal module (for example, $u_{AB}$ and $u_{AC}$ within the current interval 100, FIG. 4) in the sector I (FIG. 9) it is necessary:

1) at first to form non-zero vectors of the line voltage that corresponds, for example, with the voltage $u_{AB}$ and with vectors 4.1 and 4.2 (combinations of switches 1.1, 1.5, 1.8 and 1.1, 1.4, 1.8 in FIG. 3);

2) then to form the zero vector by simultaneous turning on of all switches being connected to the mains phase with the maximal module and having the different sign in comparison with two other phase voltages. For the considered interval of the mains period such a phase is the phase A and switches being turned on—1.1, 1.4, 1.7 (FIG. 3);

3) in the final stage of the SVM cycle to form non-zero vectors of the other line voltage, for example $u_{AC}$, which corresponds with vectors 8.2 and 8.1 (combinations of switches 1.1, 1.4, 1.9 and 1.1, 1.6, 1.9 in FIG. 3);

4) under the transition to the next SVM cycle both within the sector and under moving the vector $U_{out}$ from one sector into another (FIGS. 9,10) to place in the beginning of the period non-zero vectors which are being formed of the same line voltage that was used for the forming last vectors of the previous period, for example: 4.1, 4.2 after 4.2, 4.1; 8.1, 8.2 after 8.2, 8.1; 4.3, 4.2 after 4.2, 4.1; 8.3, 8.2 after 8.2, 8.1, etc.

Under transitions from forming voltage stationary vectors of two mains line voltage with the maximal voltage module to vectors forming of two line voltages, one of the voltages being shifted by 60 electrical degrees relative to the other voltage and having the minimal module within a current interval of the mains voltage period, the zero vector is being placed in the beginning of the cycle on the first SVM cycle after the transition, and on the following cycles—in accordance with the proposed algorithm—in the same way as it is being done under changing of the sector where $U_{out}$ is placed.

Under reverse transitions the zero vector is being placed on the last SVM cycle before the transition, in the end of the cycle.

In the ends of the mains intervals voltage period (FIG. 4) the relation of voltages between mains phases is determined exactly. The same exact determination is also on the fixed time interval before and after intervals boundaries; the duration of the interval depends on the extent of the mains voltage distortion. During this time interval the changing of the order of step-by-step switches commutation for each interval can be done in an arbitrary moment of time. Due to this fact the proposed method of current commutation for the MC with SVM is robust to the accuracy of boundaries determining for mains voltage period intervals.

The algorithm of alternating of non-zero vectors being formed of two mains line voltages with the maximal module within a current interval can be extended for these voltages to a degree beyond the interval boundary, when one of the voltages becomes of the minimal value (FIG. 3). This possibility can be used under the necessity of adjusting the shift angle of the input current space vector relative to the input voltage vector within a small interval (depending on the degree of the input voltage waveform distortion, but less than 30 electrical degrees). Under deeper control of the shift angle it is necessary to use the algorithm concerning the stationary vectors forming of two line voltages, one of them being shifted by 60 electrical degrees relative to the other and having the minimal module within a current interval of the mains voltage period.

A realization of the proposed method is shown by the example of the scheme in FIG. 12. Unit 10 of forming the task of controller 9 forms coordinates of the necessary space vector of the MC output voltage which are applying to input 11 of modulator 12. Signals of sensor 14 of mains voltages 15 are applying to other input 13 of modulator 12. On the base of the input signals modulator 12 identifies a current time interval of the mains voltage, a current sector of placing the given space vector of the input voltage, calculates durations of every state of the MC which are necessary for the realization of the SVM law and produces pulses with proper durations at the beginning of every SVM cycle. These width modulated pulses from output 16, and also codes of a current time interval of the mains voltage from output 17 and codes of current sector of the space vector of the MC output voltage from output 18 are being applied to inputs of programmed logical matrix 19. There it is being formed and distributed onto 18 channels pulses for driving halves of switches 2.1–2.9 and 3.1–3.9 (FIG. 3). During so called steady states of the MC, that is states between commutations, it is being turned on both halves of conducting switches; during dynamical state, that is under transition from one steady state to another, matrix 19 realizes step-by-step strategy of transistors commutation. The sequence of steady states and transitions mentioned above correspond with the proposed method. Output signals from output 20 of matrix 19 are applied to scheme 21 of the drivers, where it is being done the galvanic uncoupling and provided safe measures, besides it is amplified and provided matching for transistor driving pulses. From output 22 of driver scheme 21 driving pulse are applied directly to transistors of power unit 23 of the MC being loaded, for example, by an induction motor 24.

Thus, under using of the proposed method during current commutation it is being excluded the necessity to take into consideration an insensitive zone under comparing mains voltages. Due to this fact it is possible to avoid completely short circuit currents through commutated switches and overvoltages across elements of the power scheme of the MC even under very strong distortions of the input voltage waveform. Under using of the proposed method in MCs with SVM all the commutations of the switches are functionally expedient for forming the reference space vector of the output voltage and at the same time they are being done under the complete determination of the mains voltage relation.

What is claimed is:

1. A method of commutation of current by separately controlled in each direction bi-directional switches of matrix converters (MC) with at least three input phases, that contains transferring of MC load current from the first switch being turned on at both directions which connects load to one input phase into the second switch which connects load to another input phase, in accordance with the order of the opposite directions conductivity switches halves step-by-step switching, which is being set by voltages current relation for these input phases, the improvement in which is that under impossibility of the exact estimation of the voltages relation at the moment of step-by-step switching beginning, it is being identified a mains phase with the extremal module of voltage at given time-point and an intermediate current commutation is being made from the first switch to the third one which connects load to the said phase with the extremal module of voltage, whereupon current is being transferred into the second switch.

2. A method of commutation of current by separately controlled in each direction bi-directional switches of a three phase-to-three phase MC with a space vector modulation (SVM), that provides synthesis of space vectors of output voltage and input current of zero and non-zero stationary vectors during every SVM cycle, with dividing a mains voltage period into six intervals with boundaries being determined by moments of input phase voltages polarity changing, which contains transferring of MC load from the first switch being turned on at both directions which connects load to first input phase into the second switch which connects load to the second input phase, according to the order of the switches halves step-by-step switching which is being set by a voltages current relation for these input phases, the improvement in which is that under impossibility of the exact estimation of the voltages relation, a zero vector is being formed by simultaneous turning on all the MC switches being connected to the third input phase which is the phase with the extremal module of voltage within a mains current interval, and thus an intermediate current commutation is being made from the first switch into the third one which connects load to the said phase with the extremal module of voltage, whereupon current is being transferred into the second switch.

3. A method as defined in claim 2, wherein under the in turn using of two input line voltages for non-zero stationary vectors forming, one of the voltages being shifted by 60 electrical degrees relative to the other voltage and having the minimal module within a current interval of the mains voltage period, non-zero vectors are being grouped according to the sign of alternating of unidirected vectors or of being formed of the extremal module input line voltage vectors, and if the last vector of previous and the first vector of the next group are non-unidirected and at least one of them is formed of the minimal module input line voltage within the interval of mains voltage period, then a zero vector is being placed between these groups in accordance with time of forming.

4. A method as defined in claim 2, wherein under the in turn using of two input line voltages which are the extremal module ones within the interval of mains voltage period for non-zero stationary vectors forming, non-zero vectors are being grouped according to the sign of forming of the same input line voltage, and a zero vector is being placed between these groups in accordance with time of forming, and under conjugating of SVM cycle the last vector of the previous cycle and the first vector of the next cycle is being formed of the same input line voltage.

* * * * *